United States Patent [19]
Pavlo

[11] 3,754,445
[45] Aug. 28, 1973

[54] ACID TESTER FOR BATTERIES
[75] Inventor: William A. Pavlo, Fleetwood, Pa.
[73] Assignee: General Battery Corporation, Reading, Pa.
[22] Filed: Sept. 5, 1972
[21] Appl. No.: 286,213

[52] U.S. Cl. .................................. 73/441, 73/356
[51] Int. Cl. ............................................ G01n 9/14
[58] Field of Search .................... 73/441, 442, 444, 73/447, 448, 449, 356

[56] References Cited
UNITED STATES PATENTS
3,386,289  6/1968  Norcross ............................. 73/441
3,633,425  1/1972  Sanford ............................... 73/356

Primary Examiner—James J. Gill
Assistant Examiner—Anthony V. Ciarlante
Attorney—Henry N. Paul, Jr., John F. McNulty et al.

[57] ABSTRACT

A device of the syringe type is provided, adapted to siphon electrolyte from cells of batteries, to ascertain, like a hydrometer, if the specific gravity of the electrolyte is sufficient to cause floating of a float in the electrolyte within the device, to determine the state of the charge, and with the float also having specific characteristics for advising the operator, if the test is being conducted at the proper temperature.

10 Claims, 2 Drawing Figures

Patented Aug. 28, 1973  3,754,445

ACID TESTER FOR BATTERIES

BACKGROUND OF THE INVENTION

In the art of lead acid storage batteries, and particularly at the points of distribution to the public, many individuals who are charged with the sale and/or installation of batteries may lack the technical training to thoroughly understand the proper handling of batteries. Specifically, in the handling of automobile batteries and the like, it is necessary to apply an electrolyte to the battery cells, and then place the battery in a charging circuit, until the electrolyte reaches the desired level, at a desired temperature.

It has been found that 6-volt batteries should be charged at 60 to 70 amps, and 12-volt batteries charged at 30 to 40 amps, each for at least 10 minutes. This applies to most batteries, although there may be exceptions in certain instances. These charges should be done on the battery, with the electrolyte in the battery at a level at the top of the plate separators.

The specific gravity of the electrolyte or battery acid solution for automobile batteries for example, it has been found, should be at 1.250, or higher, at 80° Fahrenheit or above. It has been found that both the specific gravity value mentioned above and the 80° Fahrenheit temperature minimum, for conducting the test, must be met, for proper readying a battery for use.

Considering the type of retail outlets and the like, wherein untrained clerical personnel often actually sell the batteries, for installation by a purchaser, or wherein gasoline attendants and the like, in gas stations may install the batteries, such personnel often being untrained and unfamiliar with the reading of hydrometers and the like, it becomes highly desirable to minimize the complications of properly readying a battery for usage. Thus, it has been found that to provide instructions with each battery that the temperature of the battery should first be brought to a level of 80° F. or above, and then a hydrometer reading should be taken, in order to assure that the specific gravity of the electrolyte is at the desired level (generally 1.250 or above), would ordinarily require two distinct operations by the personnel installing the battery. Thus, in may instances it may happen that only the hydrometer reading is taken, and the requirement that the specific gravity be at the desired value at a specific temperature is overlooked. If the specific gravity reading is taken at a temperature below about 80° F., an improper value for the specific gravity of the electrolyte will be ascertained, and the charging is likely to be discontinued too early, thereby resulting in an insufficiently charged battery that potentially may cause other operating difficulties, such as not sustaining its charge.

SUMMARY OF THE INVENTION

The present invention is directed toward providing a simple and inexpensive testing device for batteries that is capable of ascertaining (1) If the battery is being tested at a temperature above the desired minimum testing temperature; and (2) if the specific gravity of the electrolyte in a battery cell being tested is substantially at a minimum acceptable level.

Accordingly, it is a primary object of this invention to provide a novel acid testing device for batteries and the like.

It is a further object of this invention to provide a testing device that does not require readings of gauges and the like, but which is simple and expedient to read.

It is a further object of this invention to accomplish the objects set forth immediately above, wherein the reading involves only the determination of color of a floatable member, and the determination of whether or not the floatable member is floating in the electrolyte being tested.

It is a further object of this invention to provide a novel acid testing device for batteries that may be constructed sufficiently inexpensively that such a device may be provided for each battery being sold.

Other objects and advantages of the present invention will be readily apparent to those skilled in the art from a reading of the following brief descriptions of the drawings figures, detailed description of the preferred embodiment, and the appended claims.

DESCRIPTION OF THE PREFERRED EMBODIMENT

Figure 1:
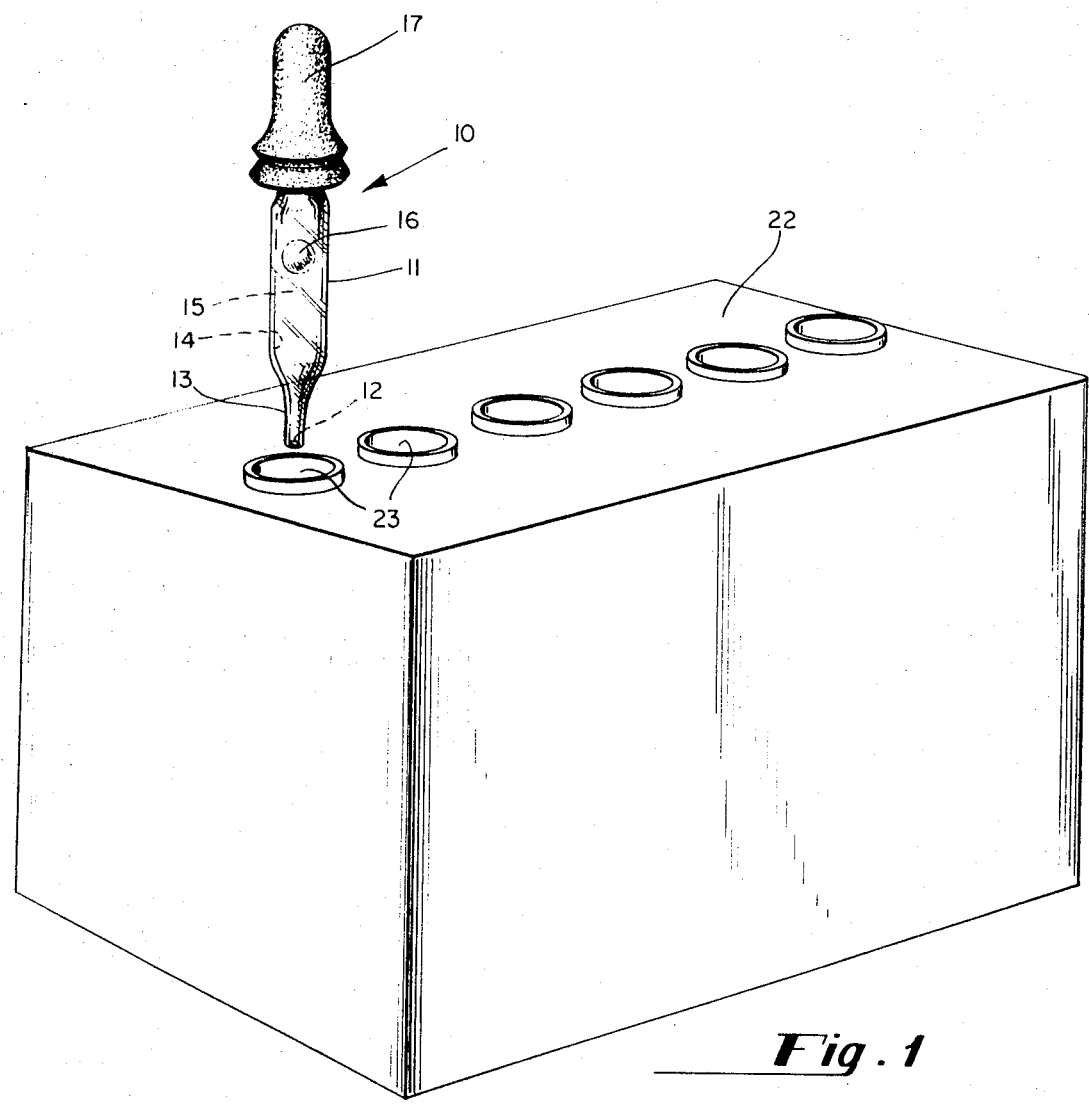
FIG. 1 is a top perspective view of a testing device in accordance with this invention, and a battery adapted for testing by the same.
Figure 2:
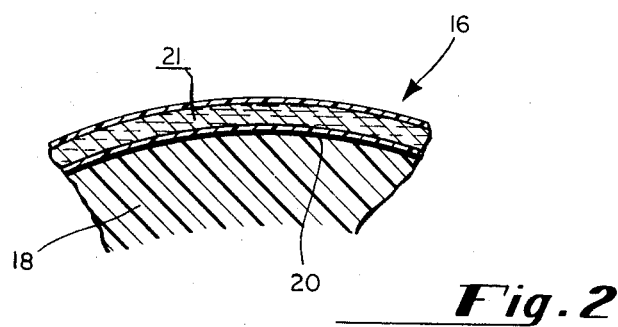
FIG. 2 is an enlarged fragmentary sectional view of a floatable member, for use with a syringe-type testing device, in accordance with this invention.

Referring now to the drawings in detail, reference is first made to FIG. 1, wherein the syringe-type testing device is generally designated by the numeral 10, as comprising a generally transparent tubular member 11, of glass, plastic or like construction that is suitable for use with mild acids, electrolytes, etc. The tubular member 11 is elongated, as illustrated in FIG. 1, and has an opening 12 at its lower end, the outer portion 13 of which is of reduced diameter, for facilitating inlet of the member 10, into an opening in a battery cell. The member 11 has an inner surface 14 that defines a bore 15, adapted to accommodate a ball-type float member 16 therein, for freedom of movement vertically through the bore 15, depending upon the liquid level in the bore 15. It will be noted that the lower end of the bore 15 is of reduced diameter, in order to prevent discharge of the ball 16 outwardly through the opening 12. It will be noted that the bore 15 is generally cylindrical in construction, and such recitation "generally cylindrical" can also accommodate a slightly tapered configuration, if desired.

It will further be noted that while the member 11 is referred to as being "glass-like", such a term will be construed within the context of this specification as encompassing certain plastics and the like that are functional equivalents of glass in this context.

At the upper end of the member 11, there is provided a manually squeezable or deformable bulb member 17, fitted over the open upper end of the member 11, in tight sealing relation therewith, with the member 17 being adapted to be squeezed within its elastic limit and then being permitted to return to its original shape as illustrated in FIG. 1, creating a partial vacuum within the member 11, for drawing battery electrolyte into the tubular member 11, through the inlet 12 thereof.

The ball 16 may be of any suitable interior construction, having wax and clay as a weighting member 18, and with an outer surface layer or portion 21 of the ball 16 being constructed of a material that will change color at a given temperature, preferably at about 80° F. The ball portion 18 is usually made of wax containing selected amounts of fillers such as clay to adjust the specific gravity to the range desired. The surface layer 21 may be adhered to the weighting portion 18 by a layer 20 of lacquer, for example black in color. The surface 21 of the ball 16 may be impregnated with liquid crystals of the type that change color in a response to application of heat thereto, with such crystals being selected in type and number, in order that a readily observable color change will effective upon contact of battery electrolyte drawn into the member 11 through the inlet 12, with the outer surface of the ball 16. The outer surface 21, as aforesaid, may comprise liquid crystals of the cholesteric type, that are encapsulated. One type of such crystal would be that disclosed in U.S. Pat. No. 3,585,381, issued June 15, 1971, having a type and number of liquid crystals adapted to give a desirable color change phenomena that is readily observable, at 80° F. It will also be apparent, that if desired, the liquid crystal coating 21 for the ball 16 could be of the type that changes color a plurality of times, at different temperatures. For example, the surface 21 could be of a type that, at 80° F. will change from the color red to green, but that at some upper limit of temperature, above which battery acid specific gravity testing is not recommended, for example 110° F., the surface 21 could change to another color, for example blue, giving a double indication of color change, between which the measurement or determination of acceptable specific gravity of the electrolyte may be made.

It will also be apparent that the ball 16 is weighted by the portion 18, or otherwise, to float upon the electrolyte being drawn from a cell inlet 23 of a battery 22 having a specific gravity reading of 1.250. Thus, the weight of the ball 20, in order to float in such an electrolyte, will also be a function of its size (dimensional) characteristics, all of which affect density and specific gravity.

It will further be noted that the glass tubular member 11 could be provided with graduations to give a specific indication of specific gravity, if desired. However, an important aspect of the present invention lies in its adaptablility to simplicity, whereby one need only determine if the ball 16 is floating in an electrolyte within the tubular member 11, and if its color is proper, in order to assure that the electrolyte in the battery is at a desired level of charge at the proper temperature. It will thus be apparent that the device of this invention is sufficiently simple that the same may be inexpensively constructed and individually provided with each battery. However, as has been mentioned above, in cases where more experienced personnel are involved in the measurement of acceptability of the electrolyte, the provision of graduations on the tubular member 11, for precise indication of specific gravity numerically, and/or the precise indication of temperature of the electrolyte, by recording which of a plurality of colors appears on the surface of the ball 16 at any instant, for indicating a precise temperature, may be employed, as for example, at the point of battery manufacture, for testing purposes.

It will also be apparent that any other type of color-change surface phenomena may be employed for the ball 16, as may various modifications be made in the details of construction, as well as the use and operation of the hydrometer of this invention, all within the spirit and scope of the invention as recited in the appended claims.

What is claimed is:

1. A testing device for use in checking battery acid, comprising an elongated tubular member of substantially transparent glass-like construction having a generally cylindrical inner surface defining an elongated bore, said bore being of reduced diameter at the lower end, and having a battery acid-receiving inlet at the lower end, means carried at the upper end of the tubular member adapted to be deformed manually for resilient recovery thereby creating a partial vacuum inside the tubular member for drawing battery acid thereinto, a float member disposed in said tubular member for longitudinal movement along the bore thereof above said reduced diameter portion, said float member being of a size and weight to provide an indication as a function of its floatation characteristics of the specific gravity of battery acid received within the tubular member, with said float member comprising at least an outer surface portion having predetermined color-change characteristics responsive to temperature, comprising means operative in response to temperature of battery acid receiving through the inlet of said tubular member, for indicating if the acid is at an acceptable temperature for determining specific gravity characteristics thereof by undergoing a visually observable color change.

2. The device of claim 1, wherein said float member is of the ball type, having a size and weight for indicating if the acid being tested has a predetermined acceptable level of specific gravity by floating if the specific gravity of the acid is at least at the predetermined level.

3. The device of claim 2, wherein said float member has size and weight characteristics for indicating if the specific gravity of the acid being tested is at least about 1.250.

4. The device of claim 3, wherein the characteristics of the outer surface of the float member are selected to change color only if the temperature of the acid being tested is at least 80° F.

5. The device of claim 4, wherein the tubular member has a reduced outer diameter at its lower end for facilitating the entry thereof into battery cell openings.

6. The device of claim 4, wherein said tubular member is free of any graduations, for indicating only if an acceptable level of specific gravity for the acid being tested is reached, by the floatation of the float member in the acid.

7. The device of claim 1, wherein the float member is of the elongated type, having a size and weight and indicia thereon for indicating the actual value of specific gravity of the acid being tested.

8. The device of claim 7, wherein the characteristics of the outer surface of the float member are selected to change color only is the temperature of the acid being tested is at least 80° F.

9. The device of claim 4, wherein the outer surface of the float member is comprised of encapsulated liquid crystals.

10. The device of claim 1, wherein said float member, inside its outer surface portion is of wax and clay construction.

* * * * *

UNITED STATES PATENT OFFICE
CERTIFICATE OF CORRECTION

Patent No. 3,754,445          Dated August 28, 1973

Inventor(s) William A. Pavlo

It is certified that error appears in the above-identified patent and that said Letters Patent are hereby corrected as shown below:

Column 4 line 24 change "receiving" to --received--.

Signed and sealed this 19th day of February 1974.

(SEAL)
Attest:

EDWARD M. FLETCHER, JR.            C. MARSHALL DANN
Attesting Officer                   Commissioner of Patents